US010805125B2

United States Patent
Maleki et al.

(10) Patent No.: US 10,805,125 B2
(45) Date of Patent: *Oct. 13, 2020

(54) SYSTEM AND METHOD FOR INTERFERENCE CANCELATION FROM ONE NUMEROLOGY ON ANOTHER NUMEROLOGY IN MIXED NUMEROLOGIES

(71) Applicant: Samsung Electronics Co., Ltd., Gyeonggi-do (KR)

(72) Inventors: Hamed Maleki, San Diego, CA (US); Pranav Dayal, San Diego, CA (US); Kee-Bong Song, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,033

(22) Filed: Oct. 2, 2019

(65) Prior Publication Data

US 2020/0036562 A1 Jan. 30, 2020

Related U.S. Application Data

(63) Continuation of application No. 16/006,403, filed on Jun. 12, 2018, now Pat. No. 10,461,966.

(60) Provisional application No. 62/635,175, filed on Feb. 26, 2018.

(51) Int. Cl.
*H03D 1/04* (2006.01)
*H04L 25/03* (2006.01)
*H04L 27/26* (2006.01)

(52) U.S. Cl.
CPC ...... *H04L 25/03006* (2013.01); *H04L 27/265* (2013.01); *H04L 27/2607* (2013.01)

(58) Field of Classification Search
CPC ........... H04L 25/03006; H04L 27/2607; H04L 27/265
USPC ........................................................ 375/346
See application file for complete search history.

(56) References Cited

U.S. PATENT DOCUMENTS

| 9,001,944 | B2 | 4/2015 | Wernaers |
| 9,820,281 | B1 * | 11/2017 | Werner ............... H04W 72/042 |
| 2008/0144749 | A1 | 6/2008 | Wilhelmsson et al. |
| 2017/0111930 | A1 | 4/2017 | Rajagopal et al. |
| 2017/0118055 | A1 | 4/2017 | Guey et al. |
| 2017/0353342 | A1 | 12/2017 | Bakaran et al. |
| 2018/0092106 | A1 | 3/2018 | Rico Alvarino |

(Continued)

FOREIGN PATENT DOCUMENTS

| JP | 4675790 | 2/2011 |
| WO | WO 2017005295 | 1/2017 |

(Continued)

*Primary Examiner* — Helene E Tayong
(74) *Attorney, Agent, or Firm* — The Farrell Law Firm, P.C.

(57) ABSTRACT

An apparatus and a method are provided in which a processor of a receiving apparatus regenerates time domain samples of an interfering data numerology from frequency domain received signals. The processor performs FFT, with a size corresponding to a desired data numerology, on the regenerated time domain samples to generate an interfering numerology cancellation signal. The processor subtracts the interfering numerology cancellation signal from a frequency domain received signal of the desired data numerology.

24 Claims, 9 Drawing Sheets

(56) References Cited

U.S. PATENT DOCUMENTS

2018/0198548 A1* 7/2018 Nammi ................. H04J 11/004
2018/0248642 A1* 8/2018 Si ......................... H04B 7/2656
2019/0173721 A1* 6/2019 Gao ..................... H04L 27/2676
2019/0379488 A1* 12/2019 Demir ................... H04J 11/003

FOREIGN PATENT DOCUMENTS

WO     WO 2017197155     11/2017
WO     WO 2018008981     1/2018

* cited by examiner

SYSTEM AND METHOD FOR INTERFERENCE CANCELATION FROM ONE NUMEROLOGY ON ANOTHER NUMEROLOGY IN MIXED NUMEROLOGIES

PRIORITY

This application is a Continuation Application of U.S. patent application Ser. No. 16/006,403, filed in the U.S. Patent and Trademark Office on Jun. 12, 2018, which claims priority under 35 U.S.C. § 119(e) to a U.S. Provisional Patent Application filed on Feb. 26, 2018 in the United States Patent and Trademark Office and assigned Ser. No. 62/635,175, the entire contents of which are incorporated herein by reference.

FIELD

The present disclosure relates generally to communication systems, and more particularly, to a method and an apparatus for interference cancellation from one numerology on another numerology in a mixed numerologies communication system.

BACKGROUND

Orthogonal frequency division multiplexing (OFDM) is a frequency division multiplexing technique that is widely used in current communication standards, such as, for example, New Radio (NR), Long Term Evolution (LTE), and Wi-Fi. A receiver in a $5^{th}$ Generation (5G) NR communication system is required to support mixed numerologies in which a base station (e.g., gNodeB) transmits OFDM signals with different subcarrier spacings (SCSs) and different OFDM symbol durations.

FIG. 1 is a diagram illustrating OFDM symbols for each of a desired 15 kilohertz (KHz) SCS numerology and an interfering 30 KHz SCS numerology. A desired data numerology 102 includes a desired OFDM symbol 106 and a desired OFDM symbol 108. An interfering data numerology 104 includes interfering OFDM symbols 110 through 116. As shown, two interfering OFDM symbols overlap a single desired OFDM symbol. Each OFDM symbol includes a cyclic prefix (CP) portion 118 and a non-CP portion 120.

At the receiver, in order to recover each of the different numerologies, a fast Fourier transform (FFT) operation is performed with a proper FFT size. However, after the FFT operation, the effect of an interfering data numerology on a desired data numerology may not be completely removed, and the interfering data numerology may still cause interference with the desired data numerology. Typical methods, such as, for example, receiver (Rx) filtering and Rx windowing (e.g., an overlap-add methodology), are unable to cancel the interference completely. Furthermore, for Rx filtering, a large filter length may be required depending on a frequency separation between the mixed numerologies.

SUMMARY

According to one embodiment, an apparatus is provided that includes a memory and a processor. The processor is configured to regenerate time domain samples of an interfering data numerology from frequency domain received signals. The processor is also configured to perform FFT, with a size corresponding to a desired data numerology, on the regenerated time domain samples to generate an interfering numerology cancellation signal. The processor is further configured to subtract the interfering numerology cancellation signal from a frequency domain received signal of the desired data numerology.

According to another embodiment, a method is provided in which a processor of a receiving apparatus regenerates time domain samples of an interfering data numerology from frequency domain received signals. The processor performs FFT, with a size corresponding to a desired data numerology, on the regenerated time domain samples to generate an interfering numerology cancellation signal. The processor subtracts the interfering numerology cancellation signal from a frequency domain received signal of the desired data numerology.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
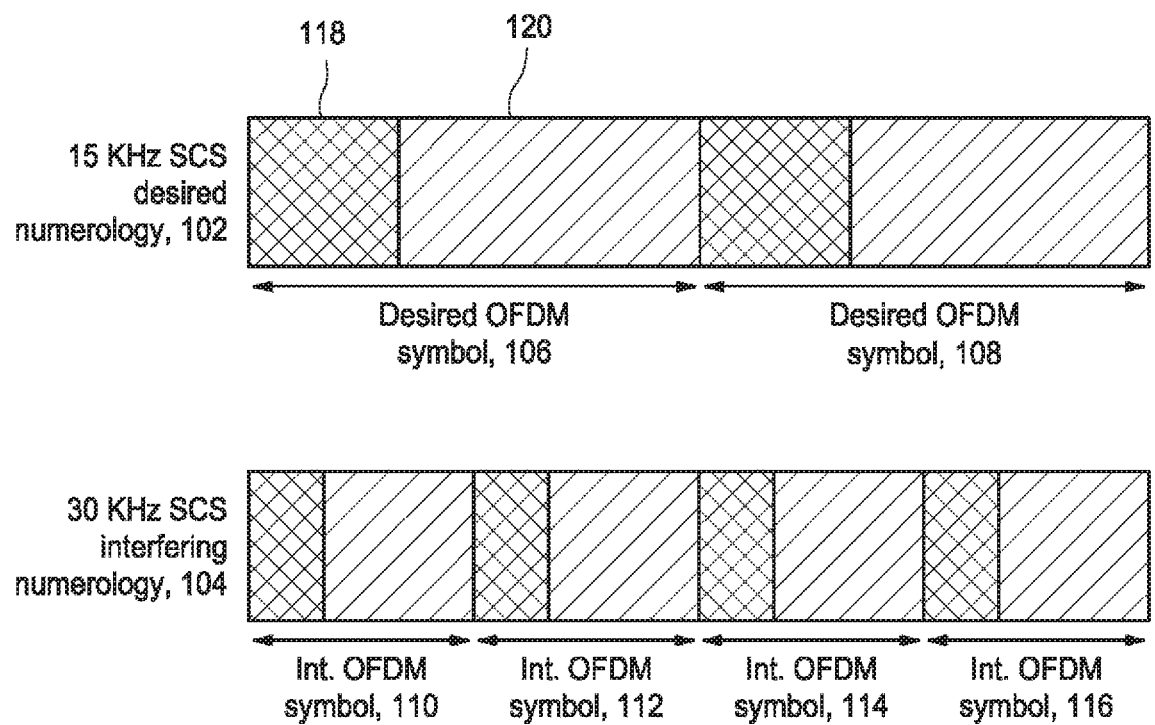
FIG. 1 is a diagram illustrating OFDM symbols for each of a 15 KHz SCS desired numerology and a 30 KHz SCS interfering data numerology.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents described herein.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

According to an embodiment of the present disclosure, an interfering data numerology is decoded. In order to mitigate the interference, time domain samples of the interfering data numerology are regenerated over multiple OFDM symbols, even when the time domain channel cannot be estimated with sufficient resolution. Both a cyclic prefix (CP) portion and a non-CP portion of the interfering data numerology are generated. The interference from an interfering data numerology is canceled on a desired data numerology to significantly improve performance.

An example of interfering numerology can be synchronization signal/physical broadcast channel (PBCH) block (SSB) and an example of the desired numerology includes physical downlink shared channel (PDSCH) data.

A user equipment (UE) receives synchronization signals (SS), including a primary synchronization signal (PSS) and a secondary synchronization signal (SSS), in order to perform cell search. The UE may assume that reception occasions of a PBCH, PSS, and SSS are in consecutive OFDM symbols and form an SS/PBCH block (SSB). In the time domain, an SSB includes four (4) OFDM symbols, numbered in increasing order from 0 to 3, within the SSB, where PSS, SSS, and PBCH with an associated demodulation reference signal (DMRS), occupy different symbols.

Figure 2:
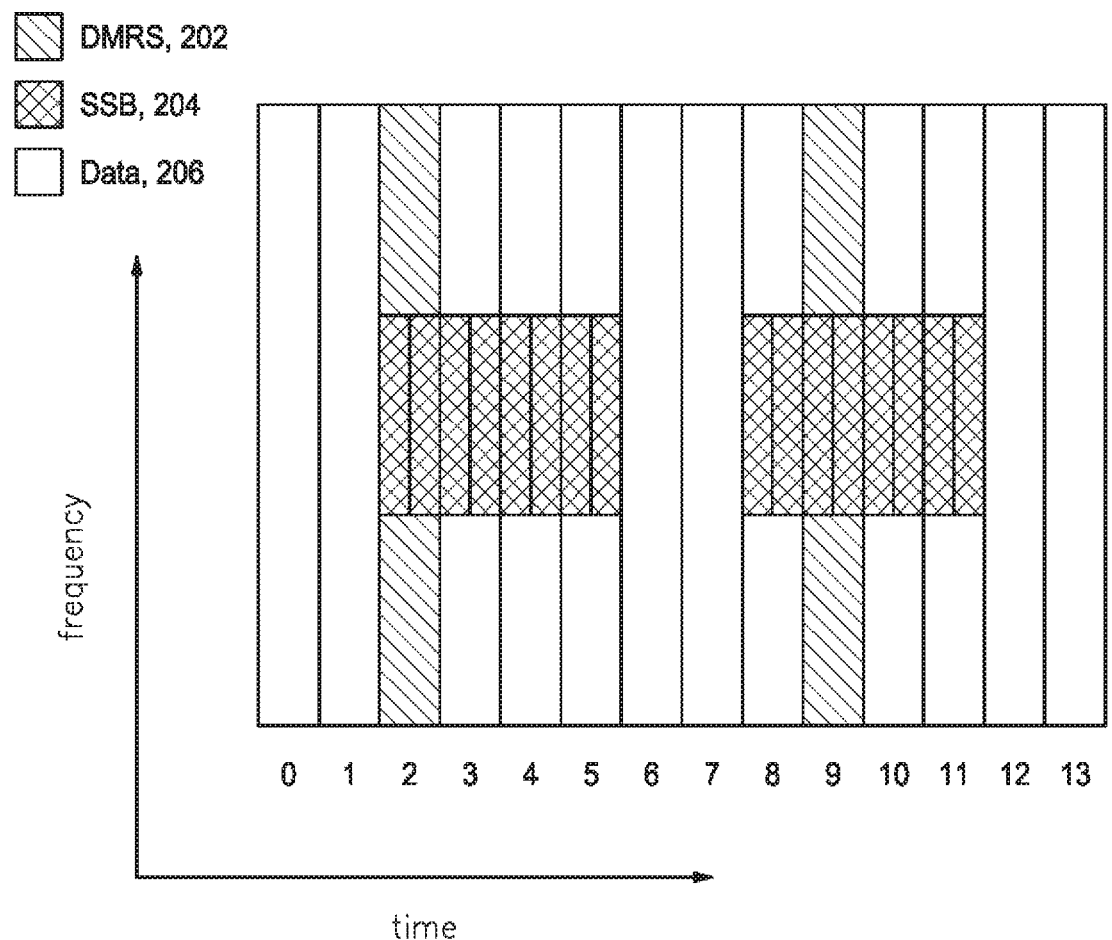
FIG. 2 is diagram illustrating locations of candidate SSBs for the first 14 OFDM symbols of data for 15 KHz data numerology and 30 KHz SSB numerology.

FIG. 2 is a diagram illustrating locations of candidate SSBs 204 for the first 14 OFDM symbols of data 206 and DMRS 202 for 15 KHz data numerology and 30 KHz SSB numerology. For different SCSs, the locations of candidate SSBs 204 can be different. At gNodeB, the SSB may be sent together with data from a different numerology and a different subcarrier spacing.

A channel of data can be different from a channel of interfering numerology because for example the antenna ports of desired data and interfering numerologies can be different. Additionally, their beamforming can make the equivalent channels seen by them to be different. The time domain samples of transmitted desired data on OFDM symbol l is represented as set forth in Equation (1) below.

$$x_{D_l} = F_D^H X_{D_l} \qquad (1)$$

The time domain samples of transmitted interfering numerology on OFDM symbol m is represented as set forth in Equation (2) below.

$$x_{I_m} = F_I^H X_{I_m} \qquad (2)$$

The total number of interfering numerology OFDM symbols that fit within one desired data OFDM symbol can be represented as set forth in Equation (3) below assuming that SCS of the interfering numerology is higher. A similar formulation can be written for the other case.

$$k = \frac{SCS \text{ of interfering numerology}}{SCS \text{ of desired numerology}} \qquad (3)$$

The total transmitted samples of data and total transmitted samples of interfering numerology overlapped within one desired data OFDM symbol can be represented as set forth in Equations (4) and (5) below.

$$x_{D_l}^{Tot} = [x_{D_l}^{cp} x_{D_l}], l=0,1,\ldots \qquad (4)$$

$$x_{I_l}^{Tot} = [x_{I_l,k}^{cp} x_{I_l,k} \ldots x_{I_l,k+k-1}^{cp} x_{I_l,k+k-1}] \qquad (5)$$

The signal received in the time domain over desired data OFDM symbol l can be represented as set forth in Equation (6) below.

$$y_l = \left[h_{D_l} * x_{D_l}^{Tot} + h_{I_l} * x_{I_l}^{Tot}\right]_{0:N_D+N_D^{cp}-1} + \qquad (6)$$

$$\begin{bmatrix} \left[h_{D_{l-1}} * x_{D_{l-1}}^{Tot} + h_{I_{l-1}} * x_{I_{l-1}}^{Tot}\right]_{N_D+N_D^{cp}:N_D+N_D^{cp}+L-1} \\ 0 \\ \vdots \\ 0 \end{bmatrix} + z_l$$

A signal received in a frequency domain for the desired numerology $Y_{D_l}$ after desired data CP removal can be represented as set forth in Equations (7) and (8) below.

$$Y_{D_l} = F_D[y_l]_{N_D^{cp}:N_D+N_D^{cp}-1} \qquad (7)$$

$$Y_{D_l} = H_{D_l} X_{D_l} + \underbrace{F_D\left[h_{I_l} * x_{I_l}^{Tot}\right]_{N_D^{cp}:N_D+N_D^{cp}-1}}_{\text{interference on data}} + Z_l \qquad (8)$$

where $H_{D_l}$ is a channel in a frequency domain for a desired data numerology, $X_{D_l}$ represents frequency domain symbols of data for desired numerology over OFDM symbol l, $X_{I_m}$ represents frequency domain symbols of interfering numerology over OFDM symbol m, $F_D$ is a FFT matrix of the desired data numerology, $F_I$ is a FFT matrix of the interfering numerology, $h_{D_l}$ is a channel in a time domain for a desired numerology for OFDM symbol l, $h_{I_{ml}}$ is a channel in a time domain for an interfering numerology for OFDM symbol m, $x_{D_l}^{Tot}$ represents time domain samples of the desired numerology for OFDM symbol l for both CP and non-CP portions, $x_{I_l}^{Tot}$ represents time domain samples of the interfering numerology over multiple overlapping OFDM symbols l.k, l.k+1, ..., l.k+k−1 for both CP and non-CP portions, $x_{D_l}^{cp}$ represents time domain samples of the desired numerology for OFDM symbol l $x_{I_m}^{cp}$ represents time domain samples of the interfering numerology for OFDM symbol m, $N_D^{cp}$ is a CP length of desired data, $N_D$ is a FFT size of desired data, $Z_l$ represents white Gaussian noise in the frequency domain for OFDM symbol l, $z_l$ represents white Gaussian noise in the time domain for OFDM symbol l, L represents the length of multipath fading channel, and $[T]_{a:b}$ is referred to herein as samples a to b of T.

A desired data numerology may be referred to herein as a data numerology. An interfering data numerology may be referred to herein as an interfering numerology. Referring to Equation (8), the interference on the desired data includes time domain samples of signals coming from multiple received symbols of the interfering data numerology, removing the first $N_D^{cp}$, samples followed by desired data FFT operation.

According to an embodiment of the present disclosure, the time domain samples of a received interfering data numerology are regenerated. At the time of regeneration of the time domain samples of the received interfering data numerology (TD Rx Int.), interfering data numerology symbols are assumed to be decoded.

k is the number of OFDM symbols of the interfering data numerology that reside within one OFDM symbol of the desired data numerology. The OFDM symbol of the desired data numerology is denoted as l, and the OFDM symbols of the interfering data numerology are denoted as l.k+i, i=0, ..., k−1. The channel estimation of the interfering data numerology may be referred to as $\hat{H}_{I_{l.k+i}}$ for OFDM symbols l.k+i, i=0, ..., k−1. The frequency domain received signal of the interfering data numerology is constructed as $$\hat{H}_{I_{l.k+i}} \cdot X_{I_{l.k+i}}$$

for each overlapping OFDM symbol.

Inverse fast Fourier transform (IFFT) of size $N_I$ is performed on $$\hat{H}_{I_{l.k+i}} \cdot X_{I_{l.k+i}}$$

to return to time domain, where $N_I$ is the FFT size of the interfering data numerology. Such operations reconstruct all samples of the overlapping OFDM symbols of the interfering data numerology except for the CP portions.

According to an embodiment of the present disclosure, a CP portion is regenerated by performing CP regeneration without windowing. In another embodiment of the present disclosure, the CP portion is regenerated by performing CP regeneration with windowing.

According to an embodiment of the present disclosure, a CP portion is reconstructed by copying the last $N_I^{cp}$ samples of IFFT output for each OFDM symbol of the interfering data numerology into its CP portion, where $N_I^{cp}$ is the CP length of the interfering data numerology.

Figure 3:
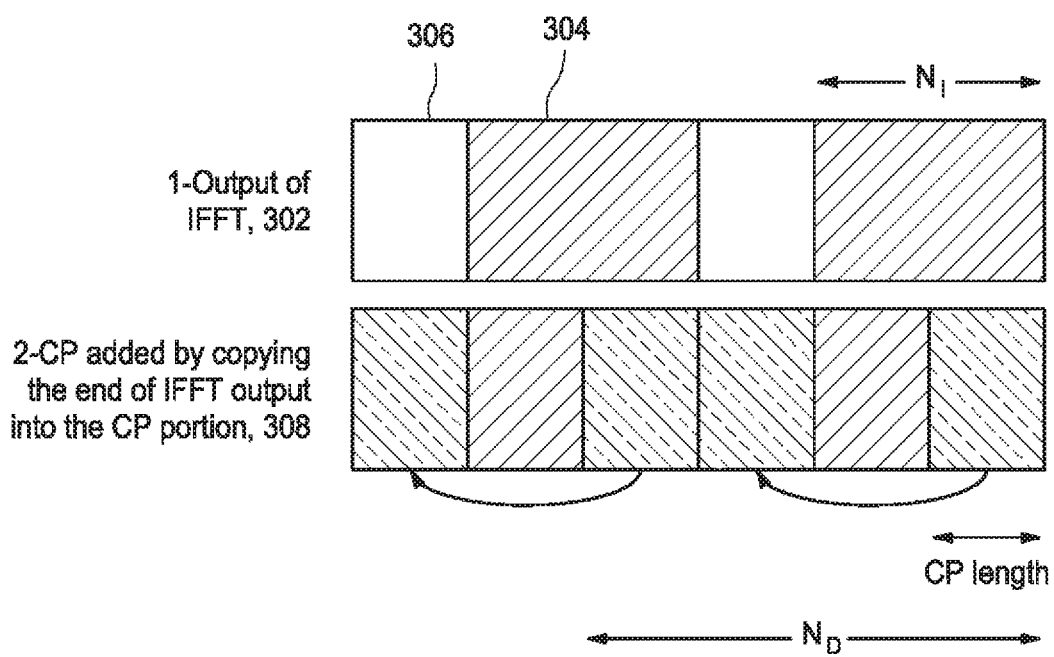
FIG. 3 is a diagram illustrating CP regeneration without windowing, according to an embodiment of the present disclosure.

FIG. 3 is a diagram illustrating CP regeneration without windowing, according to an embodiment of the present disclosure. For example, the desired data numerology is 15 kilohertz (KHz) and the interfering data numerology is 30 KHz, where 2 OFDM symbols of the interfering data numerology fit within one OFDM symbol of the desired data numerology. Each OFDM symbol of the output of the IFFT 302 includes a reconstructed non-CP portion 304 and an empty CP portion 306. The CP is added or filled in by copying the end of the IFFT output into the CP portion, as shown in 308.

For fading channels, CP regeneration without windowing adds some additional signals in the regenerated TD Rx Int. signal, which are not part of the actual signal. Furthermore, some signals are missing from the regenerated TD Rx Int. signal, which were part of the actual signal. Such additional and missing signals happen for the first couple of samples of CP portions.

Figure 4:
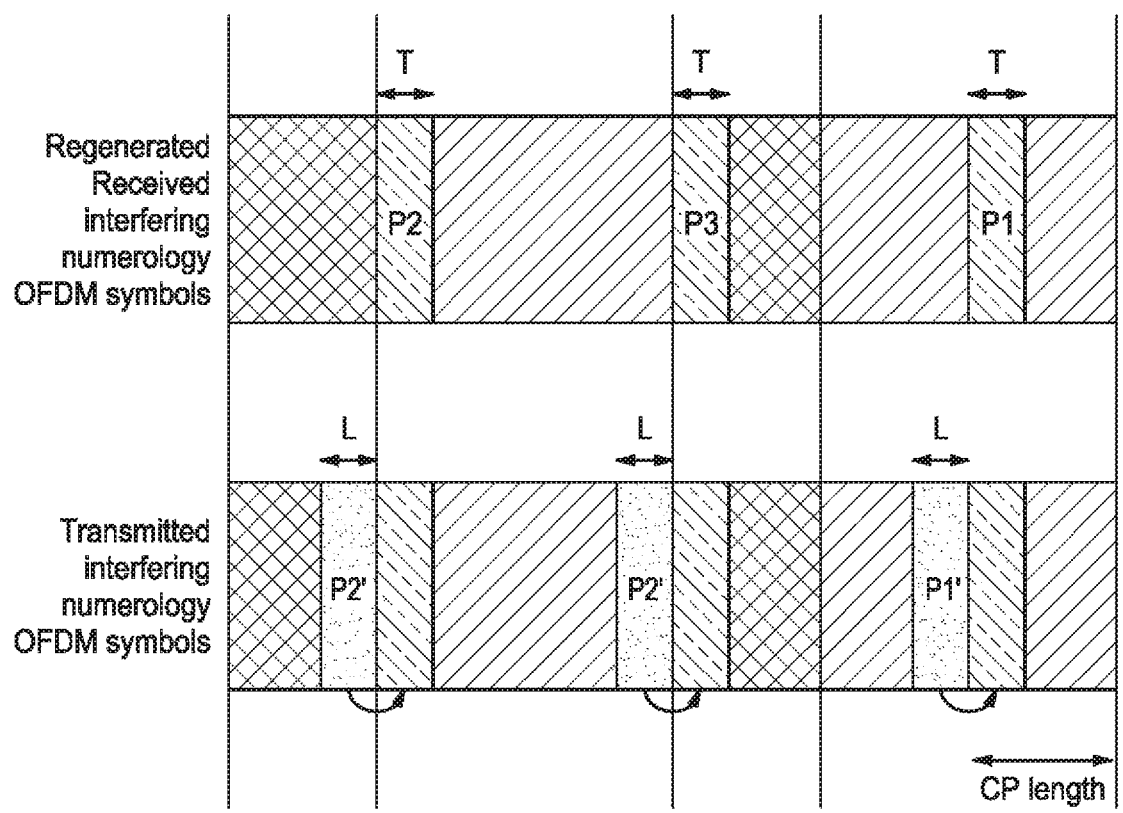
FIG. 4 is a diagram illustrating additional and missing signals caused by CP regeneration without windowing, according to an embodiment of the present disclosure.

FIG. 4 is a diagram illustrating additional and missing signals caused by the CP regeneration without windowing method, according to an embodiment of the present disclosure. P1' may be referred to as L samples of the transmitted interfering data numerology located in samples $N_I-N_I^{CP}-L+(0:L-1)$ and represented by $$[x_{I_{l.k+i}}]_{N_I-N_I^{CP}-L+(0:L-1)}.$$

The additional signal, which is added into the CP portion of OFDM symbol l.k+i, i=1, 2, ... k−1 of the regenerated TD Rx Int. signal, but it is not part of the actual one, is $[P1'^*h_{I_l}]_{L:2L-1}$, where L is the length of multipath fading channel. P2' referred to as the last L samples of interfering numerology OFDM symbol represented by $[x_{I_{l.k+i-1}}]_{N_I-L+(0:L-1)}$ as indicated in FIG. 4. The missing signal, which is not added into the CP portion of OFDM symbol l.k+i, i=1, 2, ... k−1 of the regenerated TD Rx Int. signal, but it is part of the actual one, is $[P2'^*h_{I_l}]_{L:2L-1}$.

According to another embodiment of the present disclosure, the first samples of a CP portion of the interfering numerology may be regenerated by performing a windowing operation. Suppose P1 referred to as samples located in $N_I-N_I^{CP}+(0:T-1)$ of the output of IFFT operation for the current OFDM symbol and represented by $$[O_{I_{l.k+i}}]_{N_I-N_I^{CP}+(0:T-1)}$$

and P2 referred to as samples located in $N_I^{CP}:N_I^{CP}+T-1$ of the output of IFFT for the previous OFDM symbol.

$$[O_{I_{l.k+i-1}}]_{N_I^{CP}:N_I^{CP}+T-1}$$

where $O_{s_m}$ is the output of IFFT of $\hat{H}_{s_m}.X_{s_m}$ for OFDM symbol m.

Figure 5:
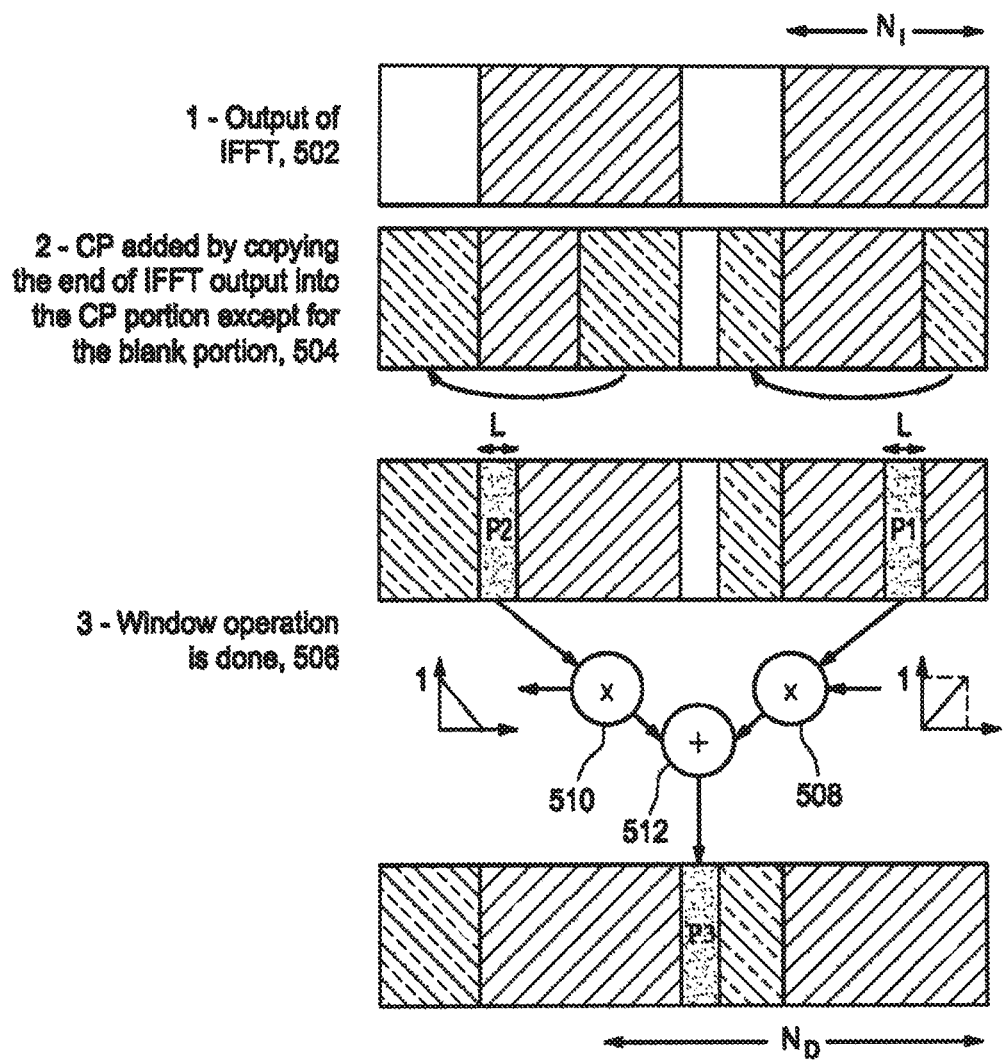
FIG. 5 is a diagram illustrating CP regeneration with windowing, according to an embodiment of the present disclosure.

FIG. 5 is a diagram illustrating CP regeneration with windowing, according to an embodiment of the present disclosure. In a windowing method, P1 has the additional signal and P2 has the missing signal.

Similar to the method of CP regeneration without windowing, the output of IFFT 502 is received, and a CP portion is added by copying an end of the IFFT output $\hat{H}_{s_{l,k+i}}.X_{s_{l,k+i}}$ into the CP portion. The last $N_f^{CP}$–T samples of the IFFT output is copied into the last samples of CP portion where parameter T can be optimized. As shown in 504, remaining in the CP portion is a blank portion or the first T samples of each overlapping interfering data numerology's OFDM symbol l.k+i, i=1, 2, . . . k−1.

A window is applied to two portions of regenerated time domain samples of the interfering data numerology, in 506. One example of windowing is triangular windowing. Windowing operation is performed on P1 and P2. One portion P1 is multiplied with a rising window at multiplier 508. The other portion P2 is located in the samples $(N_f^{CP}:N_f^{CP}+T-1)$ of the previous interfering symbol and multiplied with a falling window at multiplier 510. Windowing provides a better regeneration of the first T samples of the CP portion of each regenerated Rx TD SSB OFDM symbol l.k+i. The windowed P1 and P2 are added at adder 512 and placed in the first T samples of the current OFDM symbol represented by P3.

According to an embodiment of the present disclosure, if the SCS of the interfering numerology is larger than SCS of the desired numerology, the windowing operation is not performed for the first OFDM symbol of the overlapping interfering data numerology because the CP portion of the first OFDM symbol of the interfering data numerology resides within the CP portion of the data OFDM symbols and will be removed.

Figure 6:
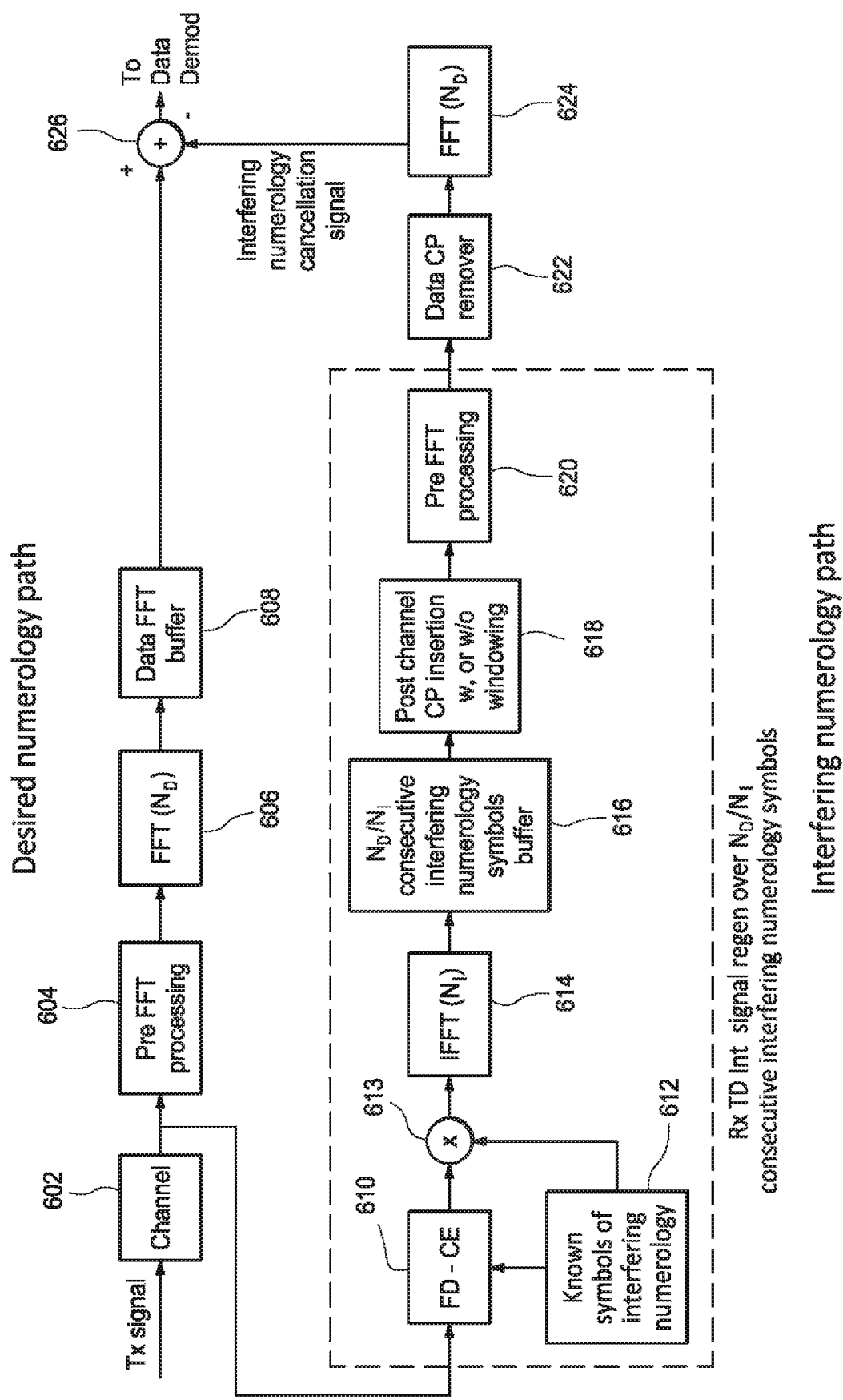
FIG. 6 is a diagram illustrating interference cancellation (IC) from an interfering data numerology, according to an embodiment of the present disclosure.

FIG. 6 is a diagram illustrating IC from an interfering data numerology, according to an embodiment of the present disclosure. The SCS of the interfering data numerology is higher than the SCS of the desired data numerology. The present disclosure may also be applied to a scenario where the SCS of the desired data numerology is higher than the SCS of the interfering data numerology, without deviating from the scope of the present disclosure.

Referring to FIG. 6, a transmitted signal including both a desired data numerology and an interfering data numerology is received by passing through channel block 602. The desired data numerology may optionally be provided to a pre-FFT processing block 604, and then to an FFT processing block 606, before storage in a data FFT buffer 608.

In order to cancel the interference on the data, the present system reconstructs the received k consecutive time domain symbols of the interfering data numerology, where k is the number of OFDM symbols of the interfering data numerology that overlap with one OFDM symbol of the desired data numerology. The interfering data numerology is provided to block 610 where frequency domain channel estimation (FD-CE) is performed. Known symbols of the interfering numerology are provided from block 612 due to decoding. Block 613 performs multiplication of FD-CE and known symbols to reconstruct the frequency domain received signal of Interfering numerology. IFFT is performed on the reconstructed frequency domain signals with a size corresponding to the interfering data numerology, in block 614, the results of which are provided to a buffer 616. CP regeneration is performed with or without windowing, in block 618. Pre-FFT processing of the desired data numerology is performed in block 620, where the FFT timing is adjusted and the pre-FFT processing of the desired data numerology is applied. The first $N_D^{CP}$ samples are removed in data CP remover block 622. FFT of size $N_D$ is performed in block 624, where $N_D$ is the size of FFT for the desired data numerology. The output of the FFT operation is subtracted from the frequency domain received signal in data subcarriers, at adder 626, before providing the result to a data demodulator.

Figure 7:
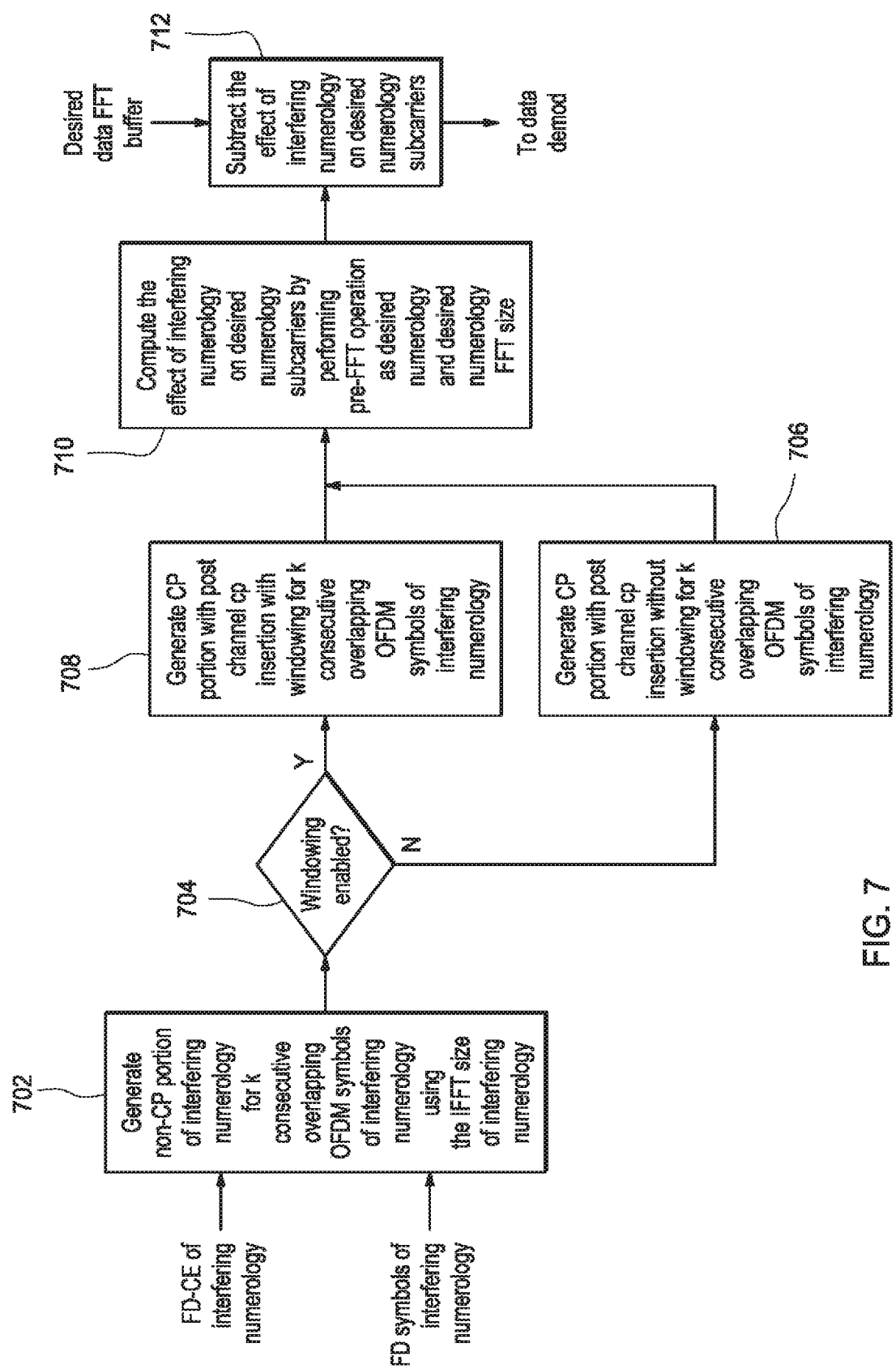
FIG. 7 is a flow chart illustrating IC from an interfering data numerology, according to an embodiment of the present disclosure.

FIG. 7 is a diagram illustrating a flow chart for IC from an interfering data numerology, according to an embodiment of the present disclosure.

The method for IC of an interfering data numerology from a desired data numerology in a mixed numerologies communication system includes regenerating non-CP portions of an interfering numerology's time domain samples for OFDM symbols of the interfering data numerology that overlap the desired data numerology using the IFFT size of the interfering data numerology, in block 702. In block 704, it is determined whether windowing is enabled. In block 706, the interfering data numerology's CP length of the time domain samples are generated by providing CP regeneration without windowing. In block 708, the interfering numerology's CP length of the time domain samples are generated by providing CP regeneration with windowing. The same pre-FFT operation that is performed on desired data numerology is performed on the interfering data numerology, in block 710. From the whole concatenated overlapping OFDM symbols, the first $N_D^{CP}$ samples are removed. The FFT operation is performed on the generated time domain samples of overlapping OFDM symbols of the interfering data numerology using FFT size same as the desired data numerology, and the frequency domain output of FFT operation is subtracted from the desired data FFT, in block 712.

Figure 8:
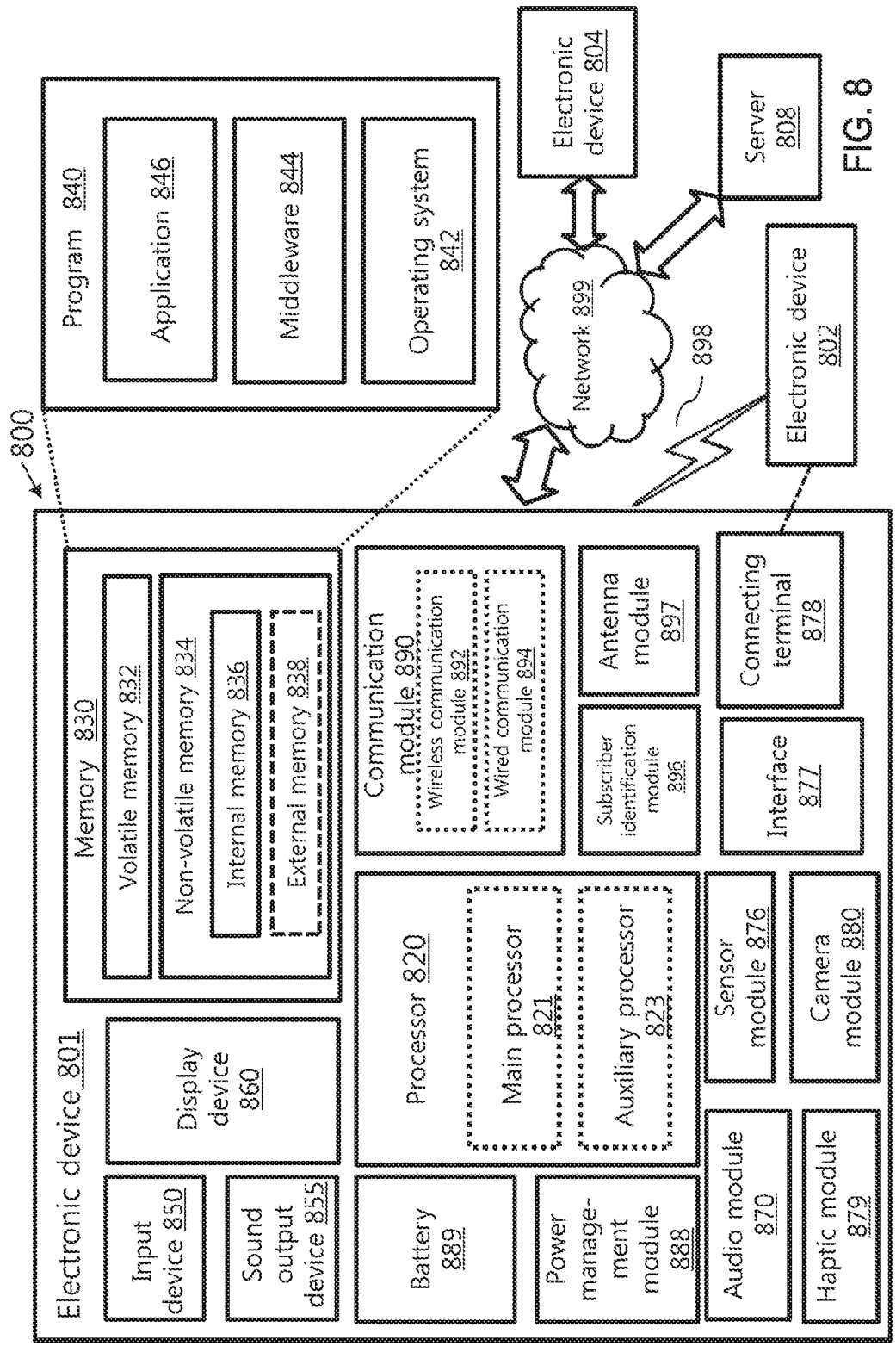
FIG. 8 is a block diagram of an electronic device in a network environment, according to an embodiment of the present disclosure.

FIG. 8 is a block diagram of an electronic device 801 in a network environment 800, according to an embodiment.

Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. The electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In an embodiment, at least one (e.g., the display device 860 or the camera module 880) of the components may be omitted from the electronic device 801, or one or more other components may be added to the electronic device 801. In an embodiment, some of the components may be implemented as a single integrated circuit (IC). For example, the sensor module 876 (e.g., a fingerprint sensor, an iris sensor, or an illuminance sensor) may be embedded in the display device 860 (e.g., a display).

The processor 820 may execute, for example, software (e.g., a program 840) to control at least one other component (e.g., a hardware or a software component) of the electronic device 801 coupled with the processor 820, and may perform various data processing or computations. According to one embodiment, as at least part of the data processing or computations, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or execute a particular function. The auxiliary processor 823 may be implemented as being separate from, or a part of, the main processor 821.

The auxiliary processor 823 may control at least some of the functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or recording, and the receiver may be used for receiving an incoming call. According to an embodiment, the receiver may be implemented as being separate from, or a part of, the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, an HDMI connector, a USB connector, an SD card connector, or an audio connector (e.g., a headphone connector).

The haptic module 879 may convert an electrical signal into a mechanical stimulus (e.g., a vibration or a movement) or an electrical stimulus which may be recognized by a user via tactile sensation or kinesthetic sensation. According to an embodiment, the haptic module 879 may include, for example, a motor, a piezoelectric element, or an electrical stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the AP) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or a standard of the Infrared Data Association (IrDA)) or the second network 899 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to an embodiment may be one of various types of electronic devices. The electronic devices may include, for example, a portable communication device (e.g., a smart phone), a computer, a portable multimedia device, a portable medical device, a camera, a wearable device, or a home appliance. According to an embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to an embodiment, a module may be implemented in a form of an application-specific integrated circuit (ASIC).

An embodiment may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. According to an embodiment, one or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. According to an embodiment, operations performed by the module, the program, or another component may be carried out sequentially, in parallel, repeatedly, or heuristically, or one or more of the operations may be executed in a different order or omitted, or one or more other operations may be added.

Figure 9:
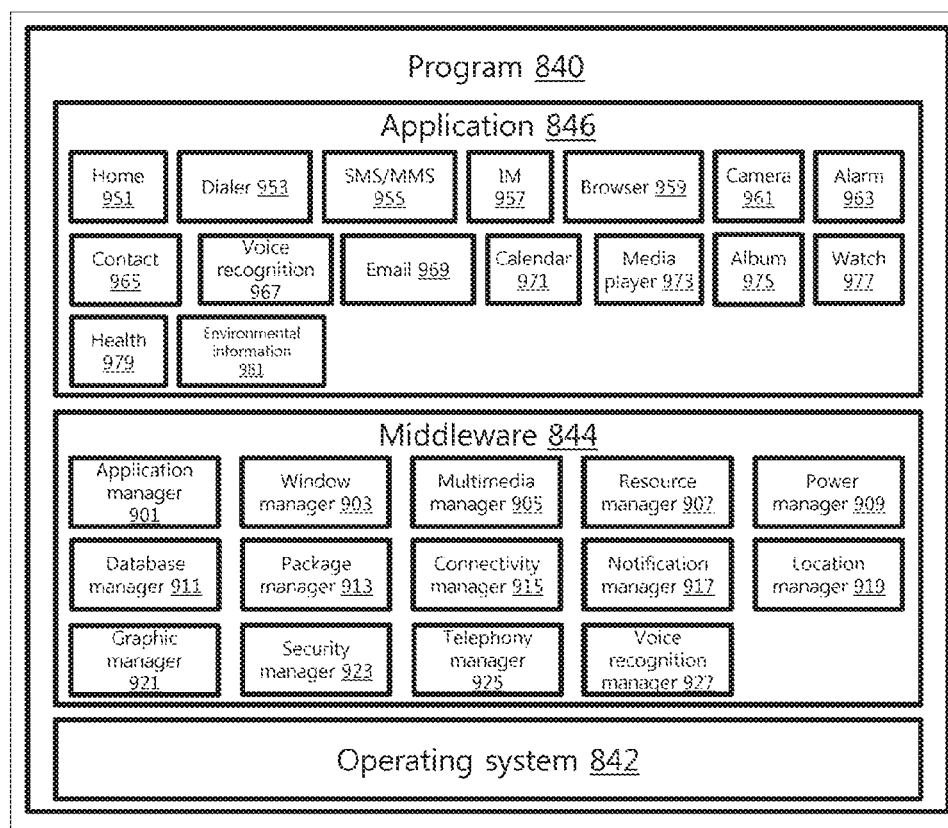
FIG. 9 is a block diagram of a program, according to an embodiment of the present disclosure.

FIG. 9 is a block diagram of the program 840 according to an embodiment.

Referring to FIG. 9, the program 840 may include an OS 842 to control one or more resources of the electronic device 801, middleware 844, or an application 846 executable in the OS 842. The OS 842 may include, for example, Android®, iOS®, Windows®, Symbian®, Tizen®, or Bada™. At least part of the program 840, for example, may be pre-loaded on the electronic device 801 during manufacture, or may be downloaded from or updated by an external electronic device (e.g., the electronic device 802 or 804, or the server 808) during use by a user.

The OS 842 may control management (e.g., allocating or deallocation) of one or more system resources (e.g., process, memory, or power source) of the electronic device 801. The OS 842, additionally or alternatively, may include one or more driver programs to drive other hardware devices of the electronic device 801, for example, the input device 850, the sound output device 855, the display device 860, the audio module 870, the sensor module 876, the interface 877, the haptic module 879, the camera module 880, the power management module 888, the battery 889, the communication module 890, the subscriber identification module 896, or the antenna module 897.

The middleware 844 may provide various functions to the application 846 such that a function or information provided from one or more resources of the electronic device 801 may be used by the application 846. The middleware 844 may include, for example, an application manager 901, a window manager 903, a multimedia manager 905, a resource manager 907, a power manager 909, a database manager 911, a package manager 913, a connectivity manager 915, a notification manager 917, a location manager 919, a graphic manager 921, a security manager 923, a telephony manager 925, or a voice recognition manager 927.

The application manager 901, for example, may manage the life cycle of the application 846. The window manager 903, for example, may manage one or more graphical user interface (GUI) resources that are used on a screen. The multimedia manager 905, for example, may identify one or more formats to be used to play media files, and may encode or decode a corresponding one of the media files using a codec appropriate for a corresponding format selected from the one or more formats. The resource manager 907, for example, may manage the source code of the application 846 or a memory space of the memory 830. The power manager 909, for example, may manage the capacity, temperature, or power of the battery 889, and determine or provide related information to be used for the operation of the electronic device 801 based at least in part on corresponding information of the capacity, temperature, or power of the battery 889. According to an embodiment, the power manager 909 may interoperate with a basic input/output system (BIOS) of the electronic device 801.

The database manager 911, for example, may generate, search, or change a database to be used by the application 846. The package manager 913, for example, may manage installation or update of an application that is distributed in the form of a package file. The connectivity manager 915, for example, may manage a wireless connection or a direct connection between the electronic device 801 and the external electronic device. The notification manager 917, for example, may provide a function to notify a user of an occurrence of a specified event (e.g., an incoming call, message, or alert). The location manager 919, for example, may manage locational information on the electronic device 801. The graphic manager 921, for example, may manage one or more graphic effects to be offered to a user or a user interface related to the one or more graphic effects.

The security manager 923, for example, may provide system security or user authentication. The telephony manager 925, for example, may manage a voice call function or a video call function provided by the electronic device 801. The voice recognition manager 927, for example, may transmit a user's voice data to the server 808, and receive, from the server 808, a command corresponding to a function to be executed on the electronic device 801 based at least in part on the voice data, or text data converted based at least in part on the voice data. According to an embodiment, the middleware 844 may dynamically delete some existing components or add new components. According to an embodiment, at least part of the middleware 844 may be included as part of the OS 842 or may be implemented in other software separate from the OS 842.

The application 846 may include, for example, a home application 951, a dialer application 953, a short message service (SMS)/multimedia messaging service (MMS) application 955, an instant message (IM) application 957, a browser application 959, a camera application 961, an alarm application 963, a contact application 965, a voice recognition application 967, an email application 969, a calendar application 971, a media player application 973, an album application 975, a watch application 977, a health application 979 (e.g., for measuring the degree of workout or biometric information, such as blood sugar), or an environmental information application 981 (e.g., for measuring air pressure, humidity, or temperature information). According to an embodiment, the application 846 may further include an information exchanging application that is capable of supporting information exchange between the electronic device 801 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 969) of the electronic device 801 to the external electronic device. Additionally or alternatively, the notification relay application may receive notification information from the external electronic device and provide the notification information to a user of the electronic device 801.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

The present disclosure may be utilized in conjunction with the manufacture of integrated circuits, which are considered part of the methods and apparatuses described herein.

According to an embodiment of the present disclosure, the method for regenerating time domain samples of received signal of a known transmitted interfering data numerology signal over multiple OFDM symbols in a mixed numerologies scenario in NR and cancelling the interference on the desired data numerology, where the cancellation is performed in the frequency domain by performing FFT of size of desired numerology. One example of the interfering data numerology is SSB that is overlapping in time with PDSCH data.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
a memory; and
a processor configured to:
regenerate time domain samples of an interfering data numerology from frequency domain received signals,
perform fast Fourier transform (FFT), with a size corresponding to a desired data numerology, on the regenerated time domain samples to generate an interfering numerology cancellation signal, and
subtract the interfering numerology cancellation signal from a frequency domain received signal of the desired data numerology.

2. The apparatus of claim 1, wherein the processor is further configured to:
perform pre-FFT processing of the desired data numerology on the regenerated time domain samples prior to performing FFT.

3. The apparatus of claim 1, wherein the interfering numerology cancellation signal subtracted from the frequency domain received signal reduces an effect of interference of the interfering data numerology on the desired data numerology.

4. The apparatus of claim 1, wherein, in regenerating the time domain samples, the processor is further configured to:
construct a frequency domain received signal for each of a plurality of symbols of the interfering data numerology that overlaps a symbol of the desired data numerology, the frequency domain received signal being constructed by multiplying a frequency domain estimated channel and frequency domain decoded interfering numerology symbols,
perform inverse fast Fourier transform (IFFT), with a size corresponding to the interfering data numerology, on reconstructed frequency domain received signals to regenerate a non-cyclic prefix (CP) portion of each of the time domain samples of the interfering data numerology, and
perform CP regeneration on an output of the IFFT to regenerate a CP portion of each of the time domain samples of the interfering data numerology.

5. The apparatus of claim 4, wherein each symbol of the interfering data numerology and the desired data numerology is an orthogonal frequency division multiplexing (OFDM) symbol.

6. The apparatus of claim 4, wherein, in performing CP regeneration, the processor is further configured to copy last samples of the non-CP portion of each of the time domain samples into the CP portion of each of the time domain samples, where a number of the last samples is equal to a length of the CP portion.

7. The apparatus of claim 4, wherein, in performing CP regeneration, the processor is further configured to:
copy last samples of the non-CP portion of each of the time domain samples into the CP portion of each of the time domain samples, leaving a blank portion in the CP portion, and
perform an overlap-add method for each of the time domain samples by:
multiplying a first portion of a current time domain sample with a first window to obtain a first result;
multiplying a second portion of a previous time domain sample with a second window to obtain a second result; and
adding the first result and the second result for application to fill in the blank portion of the CP portion.

8. The apparatus of claim 7, wherein the first window is a rising window and the second window is a falling window.

9. The apparatus of claim 1, wherein the processor is further configured to perform pre-FFT processing and remove first samples of a size equal to a CP length of the desired data numerology from the whole time domain samples of concatenated regenerated time domain samples prior to performing desired data FFT.

10. The apparatus of claim 1, wherein one example of the interfering data numerology is a synchronization signal/physical broadcast channel (PBCH) block, and one example of the desired data numerology comprises physical downlink shared channel (PDSCH) data.

11. The apparatus of claim 1, wherein the processor is further configured to decode each symbol of the interfering data numerology prior to regenerating the time domain samples.

12. The apparatus of claim 1, wherein an orthogonal frequency division multiplexing (OFDM) signal of the interfering data numerology and an OFDM signal of the desired data numerology have different subcarrier spacings and different OFDM symbol durations.

13. A method comprising:
regenerating, by a processor of a receiving apparatus, time domain samples of interfering data numerology from frequency domain received signals;
performing, by the processor, fast Fourier transform (FFT), with a size corresponding to a desired data numerology, on the regenerated time domain samples to generate an interfering numerology cancellation signal; and
subtracting, by the processor, the interfering numerology cancellation signal from a frequency domain received signal of the desired data numerology.

14. The method of claim 13, further comprising:
performing, by the processor, pre-FFT processing of the desired data numerology on the regenerated time domain samples prior to performing FFT.

15. The method of claim 13, wherein subtracting the interfering numerology cancellation signal from the frequency domain received signal reduces an effect of interference of the interfering data numerology on the desired data numerology.

16. The method of claim 13, wherein regenerating the time domain samples comprises:
constructing a frequency domain received signal for each of a plurality of symbols of the interfering data numerology that overlaps a symbol of the desired data numerology, the frequency domain signal being constructed by multiplying a frequency domain estimated channel and frequency domain decoded interfering numerology symbols;
performing inverse fast Fourier transform (IFFT), with a size corresponding to the interfering data numerology, on reconstructed frequency domain received signals to regenerate a non-cyclic prefix (CP) portion of each of the time domain samples of the interfering data numerology; and
performing CP regeneration on an output of the IFFT to regenerate a CP portion of each of the time domain samples of the interfering data numerology.

17. The method of claim 16, wherein each symbol of the interfering data numerology and the desired data numerology is an orthogonal frequency division multiplexing (OFDM) symbol.

18. The method of claim 16, wherein performing CP regeneration comprises copying last samples of the non-CP portion of each of the time domain samples into the CP portion of each of the time domain samples, where a number of the last samples is equal to a length of the CP portion.

19. The method of claim 16, wherein performing CP regeneration comprises:
copying last samples of the non-CP portion of each of the time domain samples into the CP portion of each of the time domain samples, leaving a blank portion in the CP portion; and
performing an overlap-add method for each of the time domain samples by:
multiplying a first portion of a current time domain sample with a first window to obtain a first result,
multiplying a second portion of a previous time domain sample with a second window to obtain a second result, and
adding the first result and second result for application to fill in the blank portion of the CP portion.

20. The method of claim 19, wherein the first window is a rising window and the second window is a falling window.

21. The method of claim 13, further comprising performing pre-FFT processing and removing first samples of a size equal to a CP length of the desired data numerology from the whole time domain samples of concatenated regenerated time domain samples prior to performing desired data FFT.

22. The method of claim 13, wherein one example of the interfering data numerology is a synchronization signal/physical broadcast channel (PBCH) block, and one example of the desired data numerology comprises physical downlink shared channel (PDSCH) data.

23. The method of claim 13, further comprising decoding each symbol of the interfering data numerology prior to regenerating the time domain samples.

24. The method of claim 13, wherein an orthogonal frequency division multiplexing (OFDM) signal of the interfering data numerology and an OFDM signal of the desired data numerology have different subcarrier spacings and different OFDM symbol durations.

* * * * *